United States Patent [19]

Yuasa

[11] Patent Number: 4,621,274

[45] Date of Patent: Nov. 4, 1986

[54] METHOD OF CLEANING THE RECORD HEAD OF ELECTROSTATIC IMAGE RECORDING SYSTEM OF TRANSFER TYPE

[75] Inventor: Kazuhiro Yuasa, Zama, Japan

[73] Assignee: Ricoh Company, Ltd., Japan

[21] Appl. No.: 656,498

[22] Filed: Oct. 1, 1984

[30] Foreign Application Priority Data

Sep. 30, 1983 [JP] Japan .............................. 58-183788

[51] Int. Cl.$^4$ .............................................. G01D 15/06

[52] U.S. Cl. ................................. 346/153.1; 346/154; 346/1.1; 369/71; 400/701

[58] Field of Search ...................... 346/153.1, 154, 155, 346/159, 1.1; 358/300; 400/701, 119; 15/1.5 R; 101/DIG. 13, 423-425; 369/71-73

[56] References Cited

FOREIGN PATENT DOCUMENTS 0143212 11/1979 Japan .................................... 369/71

0065954 4/1984 Japan .................................... 369/71

OTHER PUBLICATIONS

"Cleaning Apparatus for Mult. Printhead" by Applegate et al., IBM Tech. Disc. Bulletin, vol. 24, No. 2, Jul. 1981, pp. 923, 924.

*Primary Examiner*—A. Evans

*Attorney, Agent, or Firm*—Guy W. Shoup

[57] ABSTRACT

A method of cleaning the record head of an image recording system of the transfer type including an electrostatic record head having a multiplicity of electrodes arranged in an array or arrays and a preliminary charging unit operative to uniformly charge a dielectric record medium to a predetermined pre-charge voltage before the record medium is to be passed to the record medium for being activated to produce electrostatic latent images thereon by selective application of control signals to the electrodes in addition to a predetermined recording bias voltage lower than the pre-charge voltage and constantly impressed on all of the electrodes throughout each page print cycle of the system. The method comprises applying a cleaning voltage to the electrodes during a period of time continuous to one of the page print cycles, the cleaning voltage being higher than the pre-charge voltage.

8 Claims, 8 Drawing Figures

METHOD OF CLEANING THE RECORD HEAD OF ELECTROSTATIC IMAGE RECORDING SYSTEM OF TRANSFER TYPE

FIELD OF THE INVENTION

The present invention relates in general to image recording systems and, particularly, to an electrostatic image recording system of the transfer type adapted to produce prints on plain paper. More particularly, the present invention is concerned with a method of cleaning the record head of such an image recording system. As is well known in the art, an electrostatic image recording system of the transfer type to which the present invention appertains is used typically as a printer for a computer or a facsimile.

BACKGROUND OF THE INVENTION

An electrostatic image recording system of the transfer type uses a record medium in the form of an endless belt. The endless record medium is of laminar configuration and includes a film, or coating, of a dielectric substance which is to be electrostatically charged to serve as a recording layer. This endless record medium is driven to travel between two spaced, parallel rollers through a record zone established by a record head in which a multiplicity of electrodes each in the form of a stylus are arranged in an array or arrays perpendicularly to the direction of travel of the belt. These stylus electrodes are electrically connected to a source of positive or negative pulses and are selectively actuated with pulses produced on the basis of the data signals generated externally of the system. When the stylus electrodes are thus selectively actuated during a line print cycle, positive or negative charges are produced in a single line on the surface of the dielectric film of the record medium which has been preliminarily charged or discharged uniformly throughout its width. The charges thus produced on the record medium by means of the record head form a line of electrostatic latent images in dot form on the dielectric film of the record medium. The latent images are developed by application of a toner to the surface of the dielectric film and the resultant pattern of the dots of the toner particles thus deposited on the charged surface of the record medium is then transferred to a sheet of paper brought into contact with the image-carrying surface of the record medium. The pattern of the toner particles transferred to the sheet of paper is fixed by application of heat thereto at a subsequent fixation stage.

After the pattern of the toner has been transferred to the sheet of paper, the endless record medium is passed to a cleaning stage and is cleaned to remove the traces of the toner particles remaining on the record medium as well as the residual charges on the medium for being ready for use in the subsequent line print cycle. It is, however, extremely difficult and even practically impossible to perfectly remove the traces of the toner from the surface of the record medium. Thus, the record medium which has passed through the cleaning stage of the system still has traces of the toner particles which have failed to be removed from the medium at the cleaning stage. The toner particles remaining on the dielectric film of the record medium may be transferred to the tips of the stylus electrodes of the record head and may consequently spoil the quality of the images or prints to be finally printed on a sheet of paper. The deterioration in the discharge performance of the record head may further result in production of unnecessary prints or stains on the sheet of paper in addition to the prints resulting from the proper latent images produced on the record medium. This will also results in degradation of the quality of print on the paper.

It is, accordingly, an important object of the present invention to provide a novel method of cleaning the record head of an electrostatic image recording system of the transfer type.

It is another important object of the present invention to provide a novel method of cleaning the record head of an electrostatic image recording system of the transfer type by precluding transfer of toner particles from the record medium to the record head after patterns of the toner particles deposited on the record medium have been transferred to a record sheet and the traces of the toner particles remaining on the record medium have been largely removed from the record medium at the cleaning stage of the system.

SUMMARY OF THE INVENTION

In accordance with the present invention, these objects are accomplished by provision of a method of cleaning the record head of an image recording system of the transfer type having page print cycles each to produce viewable images on a recording sheet and including an electrostatic record head having a multiplicity of electrodes arranged at least in an array defining a linear record plane, a record medium movable with respect to the record head through a record zone in proximity to and parallel with the record plane, the record medium being operable for carrying electrostatic charges thereon, and charging means operative to uniformly charge the record medium to a predetermined pre-charge voltage of a first polarity substantially throughout the area of the medium before the record medium is moved to the record zone, the electrodes being actuated commonly with a substantially constant bias voltage of the first polarity and selectively with control signals of a second polarity opposite to the first polarity opposite to the first polarity for producing thereon linear patterns, each along the linear record plane, of electrostatic latent images by the selected ones of the electrodes during each of the page print cycles, the bias voltage being of a first predetermined level lower in absolute value than the pre-charge voltage, a method of cleaning the electrodes during a period of time continuous to one of the page print cycles comprising 1) charging the record medium to the pre-charge voltage substantially throughout the area of the medium, 2) applying to all of the electrodes a substantially constant cleaning voltage of the first polarity in lieu of the bias voltage and the control signals, the cleaning voltage being of a second predetermined level higher in absolute value than the pre-charge voltage, and 3) moving the record medium through the record zone for inducing between the record medium and the record plane a static field by the differential between the pre-charge voltage and the cleaning voltage and thereby urging charges to transfer from the record plane to the record medium. The cleaning voltage may be applied to the electrodes during a period of time immediately preceding or immediately subsequent to each of the page print cycles or during a period of time intervening between one of the page print cycles and the immediately subsequent one of the page print cycles. The cleaning voltage to be supplied to the record head to purge the toner particles therefrom is preferably higher than about 300 volts or, more preferably, than about 350 volts.

BRIEF DESCRIPTION OF THE DRAWINGS

The features and advantages of a method according to the present invention will be more clearly understood from the following description taken in conjunction with the accompanying drawings in which.

DESCRIPTION OF THE PREFERRED EMBODIMENTS

Figure 1:
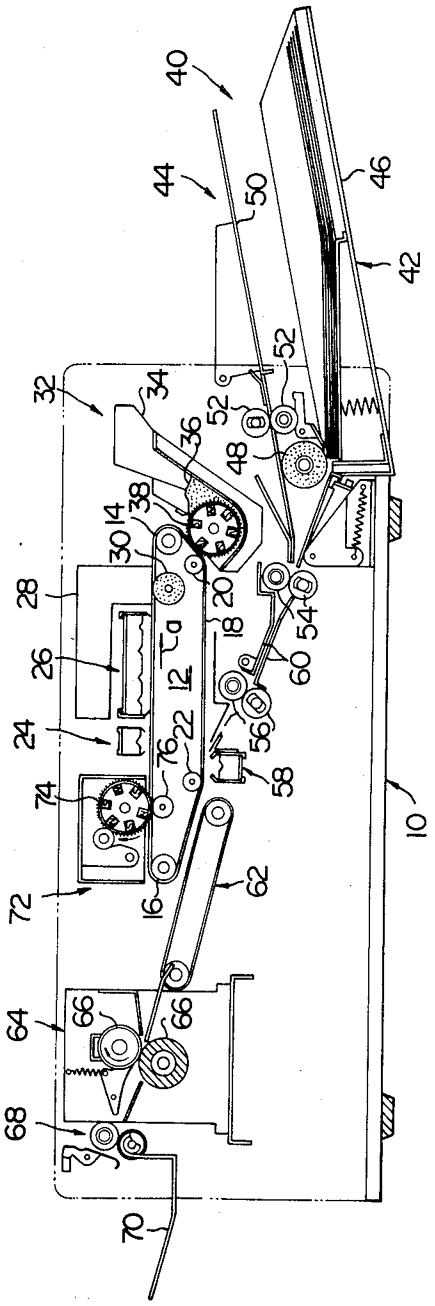
FIG. 1 is a side elevation view showing an electrostatic image recording system to which the present invention is applicable.

In FIG. 1 of the drawings is shown a representative example of an electrostatic image recording system of the transfer type in which a method according to the present invention may be put into practice. As shown, the transfer-type electrostatic image recording system comprises a casing structure 10 having front and rear walls which are shown at the right and left ends of the structure 10. The casing structure 10 has accommodated therein a recording belt and roller assembly 12 which comprises a pair of spaced parallel rollers 14 and 16 and a record medium 18 in the form of an endless belt. The endless record medium 18 is passed between these rollers 14 and 16 and is operable to travel from the roller 14 toward the roller 16 along one, or upper forward, traveling path portion of the belt as indicated by arrow a and backwardly from the roller 16 toward the roller 14 along the other, or lower backward, traveling path portion between the rollers 12 and 14. One of the rollers such as the front roller 14 in the shown arrangement is a drive roller and is connected to or otherwise associated with suitable drive means (not shown) adapted to drive the particular roller for rotation about the axis thereof. The other roller such as the rear roller 16 in the shown arrangement is an adjustable tension roller and is adapted to maintain the endless record medium 18 appropriately taut between the rollers 14 and 16. The recording belt and roller assembly 12 further comprises a suitable number of idler rollers two of which are herein shown at 20 and 22 by way of example.

Though not shown in the drawings, the endless record medium 18 is of the two-layer or three-layer laminar configuration as well known in the art. The two-layer record medium typically consists of a base layer of paper and a film, or coating, of a dielectric substance. The record medium of the three-layer configuration includes an additional layer of a low-resistance conductive substance interposed between the base layer of paper and the film or coating of the dielectric substance.

The electrostatic image recording system shown in FIG. 1 further comprises preliminary charging means adapted to have the record medium 18 charged uniformly throughout its width before information is electrostatically written into the medium. Such preliminary charging means is positioned above the upper forward travelling path portion of the endless record medium 18 and comprises a.c. and d.c. charger units 24 and 26 connected to sources of a.c. and d.c. voltages, respectively, though not shown in the drawings. These a.c. and d.c. charger units 24 and 26 are positioned in close proximity to the upper forward travelling path portion of the endless record medium 18 and extend substantially throughout the width of the endless record medium 18 perpendicularly to the directions of travel of the record medium 18. The a.c. charger unit 24 is operative to impart an a.c. voltage to the record medium 18 to remedy the irregular distribution of the charges remaining on the dielectric film of the record medium 18. The d.c. charger unit 26 is positioned downstream of the a.c. charger unit 24 in the directions of travel of the endless record medium 18 and is operative to pre-charge the dielectric film of the endless record medium 18 to a predetermined voltage (herein denoted as $V_S$) uniformly throughout the width of the medium. The voltage $V_S$ to which the dielectric film of the record medium 18 is to be thus pre-charged is assumed to be of positive polarity by way of example.

Downstream of the d.c. charger unit 26 in the direction of travel of the endless record medium 18 in turn is positioned an electrostatic record head 28 having incorporated therein a multiplicity of electrodes (not shown) each in the form of a stylus. These stylus electrodes are arranged in an array or arrays along a line perpendicular to the direction of travel a of the endless record medium 18 and thus define a uniplaner record plane at the tips of the electrodes. The record plane thus defined by the tips of the stylus electrodes is located in close proximity to the upper forward travelling path portion of the endless record medium 18 and extends substantially throughout the width of the endless record medium 18 perpendicularly to the upper travelling path portion of the record medium 18. The record head 28 cooperates with a backup roller 30 having an electrically conductive outer peripheral layer forming an electrode connected to ground. The backup roller 30 is positioned immediately below and in parallel with the above mentioned record plane of the record head 28 and thus defines a record zone, or gap, between the record plane of the record head 28 and the upper end of the roller 30. The record head 28 and the backup roller 30 constitute in combination electrostatic recording means to produce charges on the surface of the dielectric film of the record medium 18 along a line parallel with the record plane of the record head 28 in accordance with the above mentioned data signals during each line print cycle. The record means is preferably positioned immediately ahead of the drive roller 14 of the belt and roller assembly 12 as shown.

Though not shown in the drawings, the stylus electrodes are electrically connected to a source of a predetermined, positive or negative recording bias voltage (herein denoted as $V_B$) and a source of control pulses of a positive or negative voltage (herein denoted as $V_{sty}$). The recording bias voltage $V_B$ is supplied to each of the stylus electrodes throughout each page print cycle of the system and the control pulses are supplied selectively to the stylus electrodes during each of the line print cycles. The control pulses to selectively actuate the stylus electrodes of the record head 28 are delivered on the basis of the data signals supplied from an external source such as a memory. In the arrangement herein shown, the recording bias voltage $V_B$ is assumed to be of positive polarity and the voltage of the control pulses to be selectively supplied to the stylus electrodes are assumed to be of negative polarity, by way of example. As will be discussed in more detail, the recording bias voltage $V_B$ for the record head 28 is selected to be lower than the voltage $V_S$ to which the record medium 18 is to be pre-charged. When the stylus electrodes of the record head 28 are selectively actuated by the control pulses during a line print cycle, the pre-charges on the dielectric film on the record medium 18 are reduced or eliminated in a pattern following the positive or negative charges produced by the control pulses superposed on the recording bias voltage $V_B$ impressed on the electrodes. A line of electrostatic latent images in the form of dots arranged in such a pattern are thus produced on the dielectric film of the record medium 18 during each line print cycle of the system.

Ahead of the record means thus arranged and preferably in the vicinity of the drive roller 14 is positioned a developer unit 32 which is detachably fitted to the casing structure 10. The developer unit 32 comprises a toner receptacle 34 adapted to have a stock of toner 36 stowed therein and a toner applicator drum 38 mounted within the toner receptacle 34. The toner 36 typically consists of the mixture of developer particles and iron particles which serve as carriers as well known in the art. The applicator drum 38 extends also perpendicularly to the directions of travel of the endless record medium 18 and has a magnetic brush formed by magnetic fibers applied to the peripheral surface of the drum 38. By rotation of the applicator drum 38, the magnetic brush on the drum 38 cause the developer and iron particles of the toner 36 to mix with and rub against one another so that the toner particles are charged to positive or negative polarity, to the positive polarity in the shown arrangement. The toner particles thus charged are applied to the surface of the record medium 18 carrying the electrostatic latent images on the surface of the dielectric film and form a pattern of toner particles following the latent images. The construction and arrangement of the developer unit 32 per se being well known in the art and being rather immaterial to the understanding of the gist of the present invention, further details of the unit will not be herein described. It may however be noted that the developer unit 36 which is shown as being of the magnetic brush type may be substituted by a developer unit of another known type using, for example, a liquid dispersion of toner or particles of glass as carriers. Past the developer stage, the endless record medium 18 travels along the lower backward travelling path portion thereof toward the subsequent image transfer stage to be described later.

By application of the toner 36 to the surface of the dielectric film of the record medium 18, the latent images carried thereon on are developed and the resultant dotted pattern of the toner particles thus deposited on the record medium 18 is then transferred to a sheet of paper brought into contact with the image-carrying surface of the record medium 18. The sheet of paper is supplied from a sheet feed assembly 40 which is in part positioned below the developer unit 32 and in part extending outwardly from the casing structure 10 through an opening (not shown) formed in the front wall of the casing structure 10. As is customary, the sheet feed assembly 40 largely consists of an automatic feed unit 42 and a manual feed unit 44. The automatic feed unit 42 includes a sheet stock cassette 46 to have a stock of sheets of paper 48 stored therein and a sheet feed roller 48 adapted to be driven to successively feed sheets of paper 48 into the casing structure 10 at controlled timings during successive page print cycles of the system. The manual feed unit 44 is shown positioned above the automatic feed unit 42 and includes a sheet carrier table 50 and a sheet feed rollers 52 so that a pair of single sheet of paper manually placed on the table 50 is fed into the casing structure 10 at a controlled timing during a desired page print cycle of the system. The construction and arrangement of the sheet feed assembly 40 herein shown per se being well known in the art and being merely one of the various known examples of such devices, further details of the assembly will not be herein described. At the forward or discharge end of the sheet feed assembly 40 constructed and arranged as above described is provided a pair of adjustable register rollers 54 positioned below the lower backward travelling path portion of the endless record medium 18. These register rollers 54 are adapted to direct a sheet of paper to travel out of the automatic or manual feed unit 42 or 44 along a correct path in registry with the lower backward travelling path portion of the record medium 18 which is to travel backwardly past the developer unit 32.

Rearwardly of of the register rollers 54 and below the lower backward travelling path portion of the endless record medium 18 is provided image transfer means adapted to transfer the dotted pattern of the toner particles on the record medium 18 to the sheet of paper thus fed into the casing structure 10. Such image transfer means comprises a pair of transfer rollers 56 and a transfer charger unit 58 which is located at the rear of the transfer rollers 56 in close proximity to the lower backward travelling path portion of the record medium 18. The transfer rollers 56 extend in directions perpendicular to the directions travel of the endless record medium 18 and are adapted to pass a sheet of paper from the register rollers 54 to the transfer charger unit 58. Suitable guide members 60 may be provided between the pair of register rollers 54 and the pair of the transfer rollers 56 as shown to enable a sheet of paper to travel smoothly and assuredly from the register rollers 54 to the transfer rollers 56. The transfer rollers 56 are arranged to direct a sheet of paper to travel through a small gap between the transfer charger unit 58 and the lower backward travelling path portion of the endless record medium 18. The transfer charger unit 58 is electrically connected to a source (not shown) of a d.c. voltage and is operative to impart a d.c. voltage to the sheet of paper travelling over the charger unit 58 uniformly throughout the width of the sheet. It therefore follows that the dotted pattern of the toner particles deposited on the dielectric film of the record medium 18 is transferred to the sheet of paper brought into contact with the image or toner carrying surface of the record medium 18. Patterns of toner particles deposited on the record medium 18 are thus transferred line by line to the sheet of paper during the successive line print cycles of the system. The sheet of paper now carrying the images to be printed thereon is fed, past the transfer charger unit 58, on and along a conveyor belt and roller assembly 62 extending rearwardly from the transfer charger unit 58. Past the conveyor belt and roller assembly 62, the sheet of paper enters a fixation unit 64 including a pair of fixing rollers 66 one of which is heated by suitable heating means also incorporated in the fixation unit 64. The patterns of the toner particles deposited on the sheet of paper are thus fixed by application of heat thereto from the heated one of the fixing rollers 66. The printed sheet of paper is now withdrawn from the casing structure 10 by means of suitable discharge rollers 68 into a take-up tray 70 which extends outwardly from the casing structure 10 through an opening (not shown) formed in the rear wall of the structure 10.

On the other hand, that portion of the endless record medium 18 from which the deposits of toner particles have been transferred to the sheet of paper at the transfer stage is caused to pass through an electrostatic cleaning assembly 72 located in the vicinity of the rear end of the recording belt and roller assembly 12. The cleaning assembly 72 comprises a cleaning drum 74 positioned above the upper forward travelling path portion of the record medium 18. The cleaning drum 74, which is generally similar in construction to the applicator drum 38 of the developer unit 32, extends also perpendicularly to the directions of travel of the endless record medium 18 and has a magnetic brush formed on the peripheral surface thereof. The magnetic brush on the cleaning drum 74 sweeps on the surface of the dielectric film of the record medium 18 and thereby picks up the particles of the toner remaining on the surface of the dielectric film to the drum 74. The cleaning assembly 72 further comprises a pressing or backup roller 76 positioned below the cleaning drum 74 to press the record medium 18 against the turning lower end of the roller 72. The construction and arrangement of the cleaning assembly 72 per se being also well known in the art and being rather immaterial to the understanding of the gist of the present invention, further details of such an assembly will not be herein described. It may however be noted that the cleaning assembly 72 of the type herein shown is merely by way of example and may thus be replaced with a cleaning or de-charging assembly of any of other known types depending upon the type of the developer unit to be used.

Past the cleaning stage, the endless record medium 18 travels to the a.c. and d.c. charger units 24 and 26 and is for a second time pre-charged or "initialized, uniformly throughout the width of the medium 18 for being ready for recording in the subsequent line print cycle.

Figure 2:
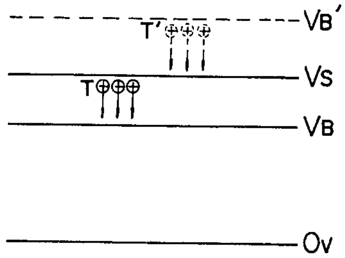
FIG. 2 is a diagram showing the various voltage levels used in the image recording system in carrying out a method according to the present invention.

As discussed previously, extreme difficulties are encountered in perfectly removing the traces of the toner particles from the surface of the record medium 18 by means of the cleaning assembly of any of the types presently known. It is thus practically inevitable that the record medium 18 carries traces of the toner particles over to the recording stage during the subsequent line print cycle. Whereas, the voltage $V_S$ to which the dielectric film of the record medium is to be pre-charged and the recording bias voltage $V_B$ to be applied to the record head 28 are selected so that the latter is slightly lower than the former, as also discussed previously and as herein indicated in FIG. 2. Between the dielectric film of the record medium 18 and the recording plane of the record head 28 is thus established a static field induced by the differential between the pre-charge and recording bias voltages $V_S$ and $V_B$ throughout page print cycles of the system. When the particles of the toner remaining on the dielectric film of the record medium 18 pass underneath the recording plane of the record head 28, the toner particles which have been charged to the positive polarity as indicated at T in FIG. 2 are attracted toward the recording plane due to the static field thus induced by the differential between the voltages $V_S$ and $V_B$ and are thus caused to transfer from the record medium 18 to the recording plane or, more exactly, to the tips of the stylus electrodes forming part of the record head 28. The toner particles transferred to the tips of the stylus electrodes of the record head 28 deteriorate the discharge performance of the record head 28 and consequently spoil the quality of the images or prints to be printed on a sheet of paper. The deterioration in the discharge performance of the record head 28 may further result in production of unnecessary prints or stains on the sheet of paper and will also results in degradation of the print on the paper as discussed previously.

To provide a useful solution to these problems, the present invention proposes a novel method of cleaning the record head 28 record head of an electrostatic image recording system of, for example, the described construction. In accordance with the present invention, this is realized by precluding transfer of toner particles from the record medium 18 to the record head 28 after patterns of the toner particles deposited on the record medium 18 have been transferred to a record sheet and the traces of the toner particles remaining on the record medium 18 have been largely removed from the record medium 18 at the cleaning stage of the system. For this purpose, in a method according to the present invention, a cleaning voltage $V_B'$ higher than the voltage $V_S$ established at the pre-charged surface of the dielectric film of the record medium 18 is applied to the record head 28 when the record head 28 is not in a condition writing information into the record medium 18. This is effected prior to the start of or upon completion of the printing operation for each of the pages to be printed. In other words, the application of the cleaning voltage $V_B'$ to the record head 28 is effected prior to the start of the electrostatic printing operation for a single page or for the first one of two or more pages, during the period of time intervening between the completion of the printing operation for one of two or more pages and the start of the printing operation for the immediately subsequent one of such pages, or upon completion of the printing operation for the last one of two or more pages. The cleaning voltage $V_B'$ thus applied to the record head 28 being higher than the voltage $V_S$ at the pre-charged surface of the record medium 18, a static field is induced between the recording plane of the record head 28 and the dielectric film of the record medium 18 in a direction opposite to the field to be induced by the differential between the pre-charge and recording bias voltages $V_S$ and $V_B$ during electrostatic recording of the record medium 18. In the presence of the static field thus induced by the differential between the pre-charge voltage $V_S$ and the cleaning voltage $V_B'$, the toner particles which have once been transferred to and deposited on the tips of the stylus electrodes of the record head 28 are attracted toward and transferred back to the record medium 18 as indicated at T' in FIG. 2 and the recording plane of the head 28 is accordingly cleared of the stains.

The cleaning voltage $V_B'$ is applied in the form of a pulse having a predetermined pulsewidth. To determine an operable range of the pulsewidths of such a pulse, analysis will be made into the behaviors of the toner particles which are moved between the pre-charged surface of the record medium 18 and the recording plane of the record head 28 in response to the cleaning voltage $V_B'$ applied to the record head 28.

Assuming that each of the toner particles has a mass $m_T$ and is charged to a charge quantity $q_T$ and that the particular toner particle is given a rate of acceleration a by a static field E, there will hold the relation $$m_T a = q_T E. \quad \text{Eq. 1}$$

In this instance, the static field E depends on the differential voltage $V_d$ between the record medium 18 and the record head 28 and the gap $d_{sb}$ between the pre-charged surface of the record medium 18 and the recording plane of the record head 28 and is given as $$E = V_d/d_{sb}. \quad \text{Eq. 2}$$

Substitution of Eq. 2 in Equation 1 and integration of the resultant equation with respect to time t results in $$m_T v = q_T (V_d/d_{sb}) \cdot t, \quad \text{Eq. 3}$$

where $v = a \cdot t$. Further integration of Eq. 3 results in $$m_T x = q_T (V_d/d_{sb}) \cdot (t^2/2), \quad \text{Eq. 4}$$

where $x = v \cdot t$. It therefore follows that the period of time, $t_T$, which a toner particle takes to move from a stylus electrode of the record head 28 to the pre-charged surface of the record medium 18 is expressed in the form $$t_T = (2 m_T d_{sb}^2 / q_T V_d)^{-\frac{1}{2}} \quad \text{Eq. 5}$$

In the case of the record head 28 of an existing image recording system of the described construction, the Q/M value (i.e., the quantity of electricity per unit mass) of the toner particles deposited at the recording plane of the record head 28 has been determined to average about 3 microcoulombs per gram. The value of $m_T/q_T$ is generally written in the form $$m_T/q_T = m_T/(Q/M) \cdot m_T = 1/(Q/M) \quad \text{Eq. 6}$$

Hence, the value of $m_T/q_T$ in the case of the record head 28 of the existing image recording system is about 3 kilograms per coulomb. On the other hand, the gap $d_{sb}$ between the precharged surface of the record medium 18 and the recording plane of the record head 28 in the existing system has been determined to be about 10 microns when the thickness of the toner deposited at the recording plane is taken into account. Furthermore, the differential voltage $V_d$ between the record medium 18 and the record head 28 has been determined to be about 40 volts when the cleaning voltage $V_B'$ applied to the record head 28 is selected at 340 volts and the voltage $V_S$ to which the dielectric film of the record medium 18 is pre-charged is selected at 300. Substitution of these values of $m_T/q_T$, $d_{sb}$ and $V_d$ into Eq. 5 gives the time $t_T$ of about $4.08 \times 10^{-5}$ seconds. This means that tens of microseconds is sufficient for a toner particle to move from the record head 28 to the record medium 18, which however also means that the period of time of this order is sufficient for a toner particle to jump from the record medium 18 over to the record head 28.

Figure 3:
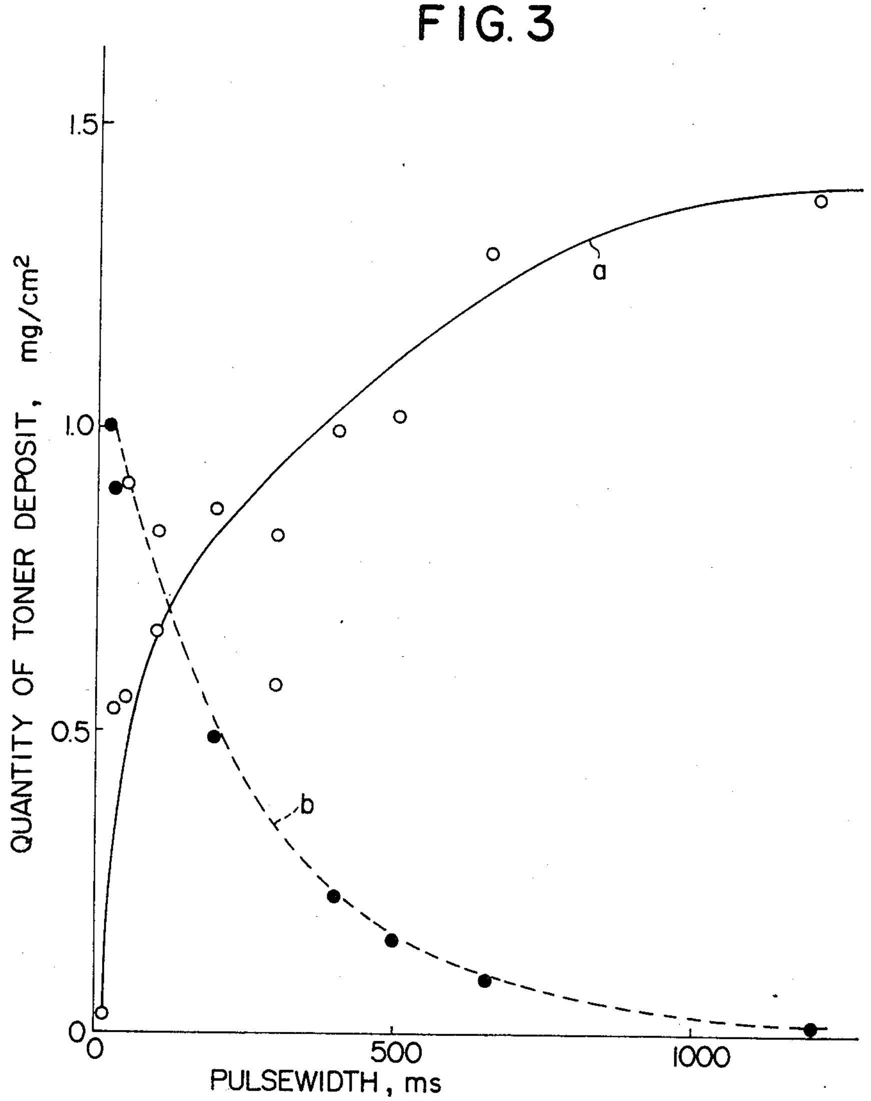
FIG. 3 is a view showing the quantities of the toner particles transferred from the record head back to the precharged surface of the record medium in the image recording system shown in FIG. 1 when pulses having different pulse-widths are used as the bias voltage to purge the toner particles from the record head in carrying out the method according to the present invention in the system shown in FIG. 1.

FIG. 3 of the drawings shows the quantities, in milligrams per centimeter square, of the toner particles transferred from the recording plane of the record head 28 back to the pre-charged surface of the record medium 18 when pulses having different pulsewidths are used as the above mentioned cleaning voltage $V_B'$. In FIG. 3, curve a of a full line indicates the variation in the quantity of the toner particles in terms of pulsewidth, while curve b of dotted line indicates variation in the quantity of the toner particles remaining at the recording plane of the record head 28 after application of the cleaning voltage $V_B'$ to the record head 28. As will be seen from curve a, only small quantities of toner particles can be transferred from the stylus electrodes of the record head 28 back to the record medium 18 when pulses having small pulsewidths are used as the cleaning voltage $V_B'$ although such durations of the pulses are sufficiently less than the time ($4.08 \times 10^{-5}$ seconds) required for a toner particle to move from the record head 28 to the record medium 18. This is considered to be primarily because of the fact that the toner particles which have once been transferred back to the record medium 18 by application of an cleaning voltage pulse to the record head 28 are caused to return to the stylus electrodes of the record head 28 since the pulse, which is assumed to have a small pulsewidth, disappears before the cleared portion of the record medium 18 withdrawn from the recording zone. Another reason will be that the pulsewidth of the pulse used is so small that the pulse could not afford to rise to the full amplitude and fails to induce a sufficient field in the gap between the record medium 18 and the record head 28.

From the above analysis it is understood that the toner particles deposited on the stylus electrodes of the record head 28 can be satisfactorily transferred back to the record medium 18 when the record head 28 is energized with a pulse having a pulsewidth not less than the value of $w_o/v_s$ wherein $w_o$ is the maximum measurement of the recording plane of the record head 28 in the direction of travel a (FIG. 1) of the endless record medium 18 and $v_s$ is the travelling velocity of the record medium 18. In an existing image recording system of the described construction, the maximum measurement $w_o$ of the recording plane is about 15 millimeters and the travelling velocity $v_s$ is about 85 millimeters per second so that the value of $w_o/v_s$ becomes about 176 milliseconds.

Curve a of FIG. 3 shows that the toner particles on the stylus electrodes can not still be purged completely when a pulse having a pulsewidth of 176 milliseconds is used. This will be for the reason that, where extremely large quantities of toner particles are deposited on the stylus electrodes, only fragments of such quantities are permitted to move from the electrodes to the record medium 18 by the time when the alternative voltage pulse applied to the record head 28 terminates. This means that the pulse to be used as the cleaning voltage $V_B'$ should have a pulsewidth which is as larger as possible than the above mentioned value of $w_o/v_s$ insofar as the local safety regulations in force permit.

Figure 4:
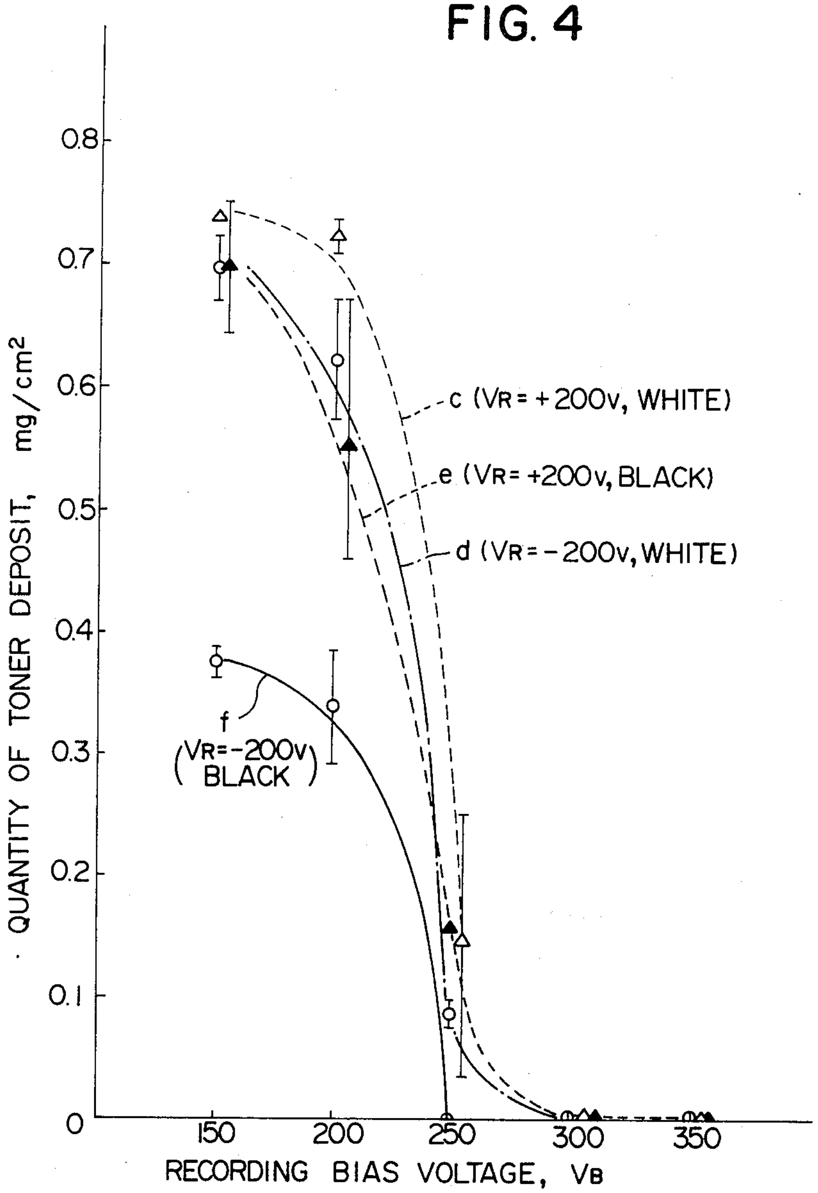
FIG. 4 is a view showing the quantities of the toner particles which are caused to deposit on the record head when the recording bias voltage applied to the record head is varied within a certain range in carrying out the method according to the present invention in the system shown in FIG. 1.

FIG. 4 of the drawings shows the quantities ($M_{sty}$), in milligrams per centimeter square, of the toner particles which are caused to deposit at the recording plane of the record head 28 when the recording bias voltage $V_B$ applied to the record head 28 is varied from 150 volts to 350 volts with the pre-charge voltage $V_S$ of the record medium 18 selected at 325 volts. In FIG. 4, curves c, d, e and f indicate the variations in the quantities of the toner particles transfeered to the record head 28 with the develop bias voltage $V_R$ selected at plus and minus 200 volts for white and black prints. From these curves c, d, e and f it will be seen that the quantity $M_{sty}$ of the toner particles transferred to the record head 28 decreases abruptly when the recording bias voltage $V_B$ is increased from about 200 volts to about 250 volts and that there are practically no toner particles transferred to the record head 28 when the recording bias voltage $V_B$ exceeds about 300 volts. This means that the quantity of the toner particles to be transferred from the record medium 18 to the stylus electrodes of the record head 28 can be minimized when the recording bias voltage $V_B$ to be supplied to the record head 28 is selected to be higher than about 300 volts.

Figure 5:
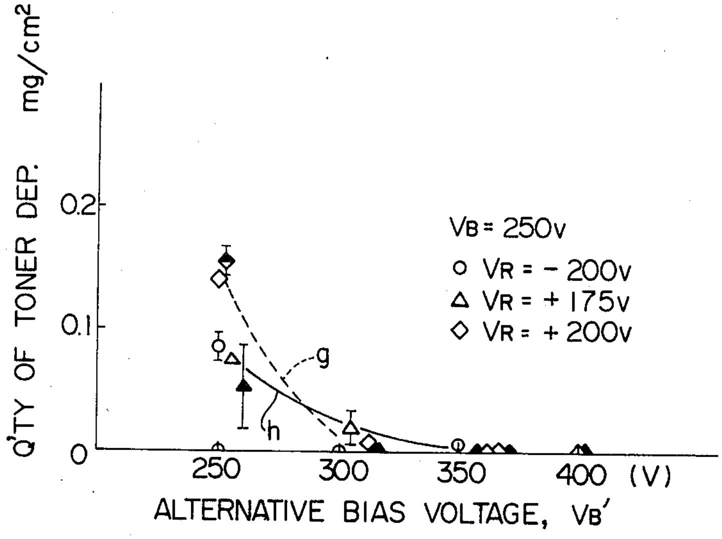
FIG. 5 is a view showing the quantities of the toner particles which remain on the record head when the recording bias voltage is selected at a certain level and the bias voltage used to purge the deposit of the toner particles is varied within a certain range in carrying out the method according to the present invention in the system shown in FIG. 1.

On the other hand, FIG. 5 of the drawings shows the quantities ($M_{sty}'$), in milligrams per centimeter square, of the toner particles which remain at the recording plane of the record head 28 when the recording bias voltage $V_B$ is selected at 250 volts and the cleaning voltage $V_B'$ used to purge the deposit of the toner particles is varied from 250 volts to 350 volts. In FIG. 5, curves g and h indicate the variations in the quantities of the toner particles remaining on the record head 28 with the voltage $V_R$ selected at plus and minus 200 volts and plus 175 volts. From these curves g and h it will be seen that the toner particles which have been deposited on the stylus electrodes of the record head 28 can be purged almost completely therefrom when the cleaning voltage $V_B'$ is selected at about 300 volts. This means that the quantity of the toner particles which can be purged from the stylus electrodes of the record head 28 can be maximized when the cleaning voltage $V_B'$ to be supplied to the record head 28 is also selected to be higher than about 300 volts.

Figure 6:
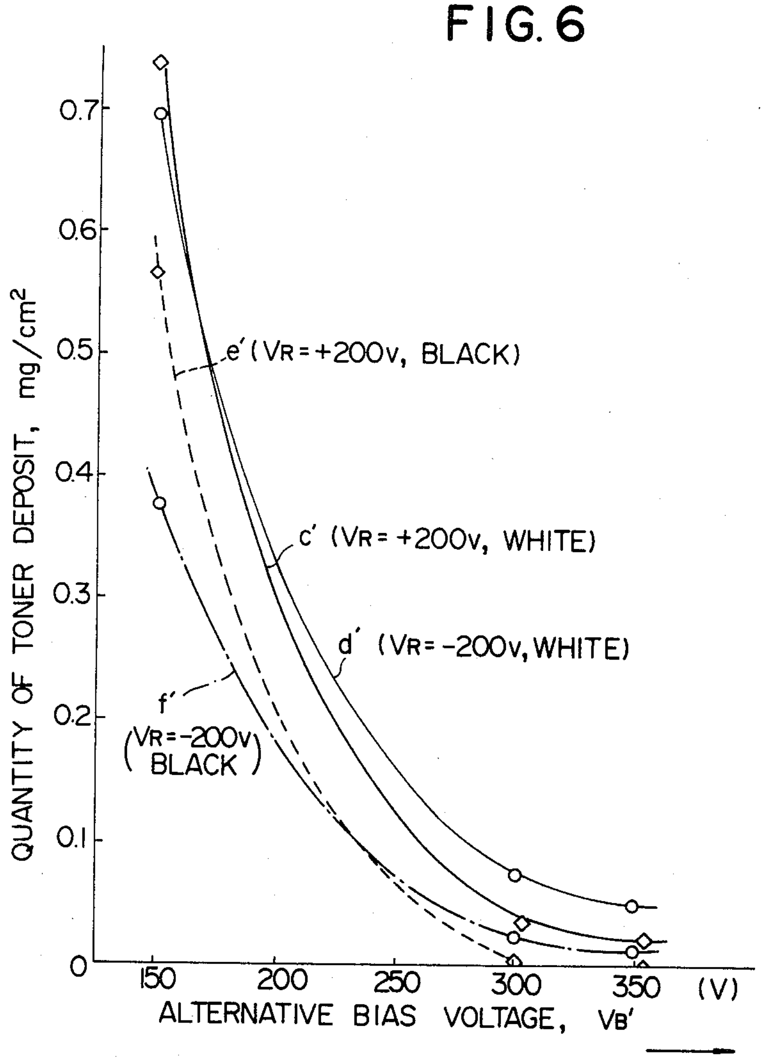
FIG. 6 is a view similar to FIG. 5 but shows the quantities of the toner particles which remain on the record head when the recording bias voltage is selected at a lower level.

FIG. 6 of the drawings shows the quantities ($M_{sty}'$), in milligrams per centimeter square, of the toner particles which remain at the recording plane of the record head 28 when the recording bias voltage $V_B$ is reduced to 150 volts and the cleaning voltage $V_B'$ is varied from 150 volts and 350 volts. In FIG. 6, curves c', d', e' and f' indicate the variations in the quantities of the toner particles remaining on the record head 28 with the voltage $V_R$ selected at plus and minus 200 volts. From these curves c', d', e' and f' it will be seen that the toner particles which have been deposited on the stylus electrodes of the record head 28 can be purged almost completely therefrom when the cleaning voltage $V_B'$ is selected at about 350 volts. This means that, where a relatively low recording bias voltage is used (which makes it easier for toner particles to move from the record medium 18 to the record head 28), the quantity of the toner particles which can be purged from the stylus electrodes of the record head 28 can be maxmized when the cleaning voltage $V_B'$ is selected to be higher than about 350 volts. It is apparent that the use of cleaning voltage of this order is also conducive to the cleaning of the record head 28 where a recording bias voltage higher than 150 volts is used.

Figure 7:
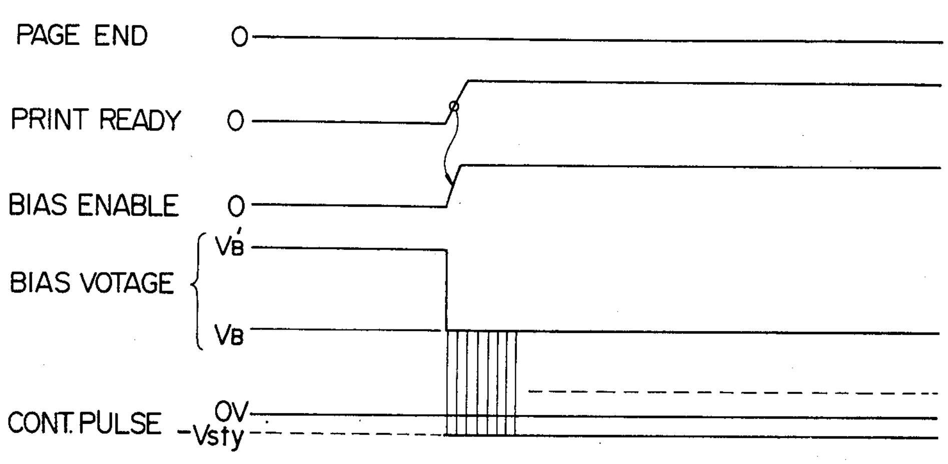
FIG. 7 is a time chart which shows the timing at which the recording bias voltage is to be supplied to the record head subsequently to termination of a cleaning operation prior to the start of the printing operation for a single page or for the first one of two or more pages in carrying out the method according to the present invention in the system shown in FIG. 1.

FIG. 7 of the drawings is a time chart which shows the timing at which the recording bias voltage $V_B$ is to be supplied to the record head 28 subsequently to termination of a cleaning operation using the cleaning voltage $V_B'$ prior to the start of the electrostatic printing operation for a single page or for the first one of two or more pages. Throughout the cleaning operation using the cleaning voltage $V_B'$, the "BIAS ENABLE" signal for the recording bias voltage $V_B$ as well as the "PAGE END" and "PRINT READY" signals is maintained at a logic "0" level. The cleaning voltage $V_B'$ higher than the pre-charge voltage $V_S$ of the record medium 18 is applied to the record head 28 and as a consequence the toner particles deposited on the stylus electrodes of the record head 28 are purged therefrom until the "PRINT READY" and "BIAS ENABLE" signals are raised to logic "1" levels. Simultaneously when the "PRINT READY" and "BIAS ENABLE" signals are shifted to the logic "1" levels, the supply of the cleaning voltage $V_B'$ is terminated and, instead thereof, the recording bias voltage $V_B$ is supplied to the record head 28 in response to the "BIAS ENABLE" signal. The printing operation for the given page is now started and the control pulses which are herein assumed to have a negative voltage $-V_{sty}$ are selectively distributed to the stylus electrodes of the record head 28. Electrostatic information is thus written into the record medium 18 by the voltage $V_B$-$V_{sty}$ developed across each of the selected one of the stylus electrodes. In the control scheme illustrated in FIG. 7, the "PAGE END" signal per se may be used also as the "PRINT READY" without having recourse to the use of the "PRINT READY".

Figure 8:
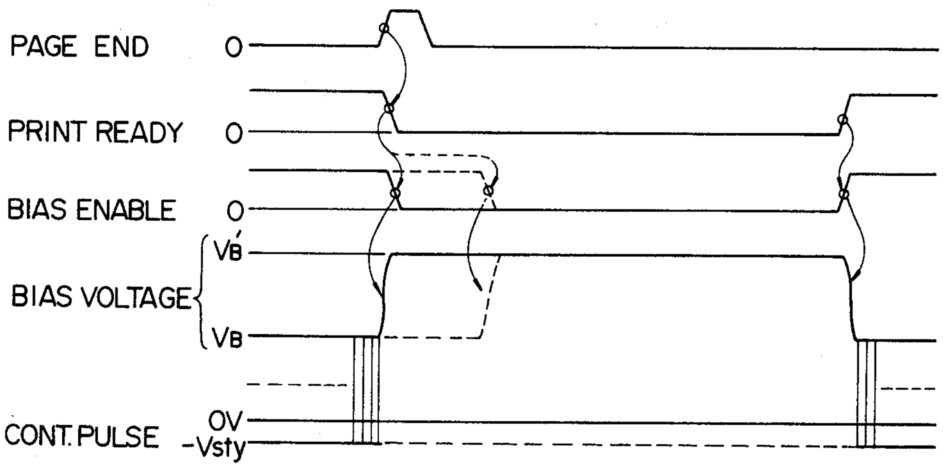
FIG. 8 is a time chart which shows the timing at which the bias voltage to purge the toner particles from the record head is to be supplied to the record head during a time interval intervening between the termination of the printing operation for one two or more pages and the start of the printing operation for the immediately subsequent one of these pages in carrying out the method according to the present invention in the system shown in FIG. 1.

On the other hand, FIG. 8 of the drawings shows the timing at which the cleaning voltage $V_B'$ is to be supplied to the record head 28 during a time interval intervening between the termination of the printing operation for one two or more pages and the start of the printing operation for the immediately subsequent one of these pages. Throughout the recording operation for the preceding one of the pages, the "PAGE END" signal is maintained at the logic "0" level and the "PRINT READY" signal and the "BIAS ENABLE" signal for the recording bias voltage $V_B$ are maintained at the logic "1" level. The recording bias voltage $V_B$ lower than the precharge voltage $V_S$ of the record medium 18 is thus applied continuously to the record head 28 and is superposed with the control pulses selectively supplied to the stylus electrodes of the record head 28. Electrostatic information is thus written into the record medium 18 by the voltage $V_B$-$V_{sty}$ developed across each of the selected one of the stylus electrodes. When the printing of the page under consideration is complete, the "PAGE END" signal is raised to the logic "1" level forming a strobe signal as shown and at the same time the "PRINT READY" and "BIAS ENABLE" signals are shifted down to the logic "0" levels. If desired, the shifting of the "PRINT READY" and "BIAS ENABLE" signals to the logic "0" levels may be effected with a certain amount of delay after the appearance of the strobe "PAGE END" signal as indicated by broken lines. Simultaneously when the "BIAS ENABLE" signal and/or the "PRINT READY" signal is shifted to the logic "0" level, the supply of the recording bias voltage $V_B$ is interrupted and, in turn, the cleaning voltage $V_B'$ higher than the pre-charge voltage $V_S$ of the record medium 18 is supplied to the record head 28. The toner particles deposited on the stylus electrodes of the record head 28 are thus purged therefrom until the "PRINT READY" and "BIAS ENABLE" signals restore the logic "1" levels. Also in the control scheme illustrated in FIG. 8, the PAGE END" signal per se may be used also as the "PRINT READY" if desired.

It should be noted that the various detailed aspects of the method according to the present invention, especially those described with reference to FIGS. 8 and 9, are simply illustrative of the gist of the present invention and are accordindly not limitative of the scope of the present invention.

What is claimed is:

1. In an image recording system of the transfer type having page print cycles each to produce viewable images on a recording sheet and including an electrostatic record head having a multiplicity of electrodes arranged at least in an array defining a linear record plane, a record medium movable with respect to said record head through a record zone in proximity to and parallel with said record plane, said record medium being operable for carrying electrostatic charges thereon, and charging means operative to uniformly charge the record medium to a predetermined precharge voltage of a first polarity substantially throughout the area of the medium before said record medium is moved to said record zone, said electrodes being actuated commonly with a substantially constant bias voltage of said first polarity and selectively with control signals of a second polarity opposite to said first polarity for producing thereon linear patterns, each along said linear record plane, or electrostatic latent images by the selected ones of said electrodes during each of said page print cycles, said biase voltage being of a first predetermined level lower in absolute value than said precharge voltage, a method of cleaning said electrodes during a period of time continuous to one of said page print cycles comprising:

(1) charging said record medium to the pre-charge voltage substantially throughout the area of the medium, (2) applying to all of said electrodes a substantially constant cleaning voltage of said first polarity in lieu of said bias voltage and said control signals, said cleaning voltage being of a second predetermined level higher in absolute value than said precharge voltage, and (3) moving said record medium through said record zone for inducing between the record medium and said record plane a static field by the differential between said pre-charge voltage and said cleaning voltage and thereby urging charges to transfer from said record plane to said record medium.

2. A method as set forth in claim 1, in which cleaning voltage is applied to said electrodes during a period of time immediately preceding each of said page print cycles.

3. A method as set forth in claim 1, in which said cleaning voltage is applied to said electrodes during a period of time immediately subsequent to each of said page print cycles.

4. A method as set forth in claim 1, in which said cleaning voltage is applied to said electrodes during a period of time intervening between one of said page print cycles and the immediately subsequent one of the said page print cycles.

5. A method as set forth in any one of claims 1 to 4, in which said cleaning voltage is higher than about 300 volts.

6. A method as set forth in any one of claims 1 to 4, in which said cleaning voltage is higher than about 350 volts.

7. A method as set forth in any one of claims 1 to 4, in which said cleaning voltage is applied to said electrodes in the form of a pulse.

8. A method as set forth in claim 7, in which said record plane is linearly elongated perpendicularly to the direction in which said record medium is movable with respect to the record head, wherein said pulse has a pulsewidth not less than the value of $w_o/v_s$ wherein $w_o$ is the maximum measurement of said record plane of the record head in the direction of movement of the record medium and $v_s$ is the velocity of movement of the record medium with respect to the record head.

* * * * *